(12) United States Patent
Wegelin et al.

(10) Patent No.: US 11,266,276 B1
(45) Date of Patent: Mar. 8, 2022

(54) TOUCH FREE DISPENSERS POWERED BY FOCUSED ENERGY SIGNALS

(71) Applicant: GOJO Industries, Inc., Akron, OH (US)

(72) Inventors: Jackson W. Wegelin, Stow, OH (US); Chip W. Curtis, La Moille, IL (US); Mark T. Smith, Canton, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 17/140,575

(22) Filed: Jan. 4, 2021

Related U.S. Application Data

(60) Provisional application No. 62/957,362, filed on Jan. 6, 2020.

(51) Int. Cl.
| | |
|---|---|
| *A47K 5/12* | (2006.01) |
| *H02J 50/00* | (2016.01) |
| *H02J 50/30* | (2016.01) |
| *H04B 10/80* | (2013.01) |

(52) U.S. Cl.
CPC .......... *A47K 5/1217* (2013.01); *A47K 5/1202* (2013.01); *H02J 50/005* (2020.01); *H02J 50/30* (2016.02); *H04B 10/807* (2013.01)

(58) Field of Classification Search
CPC ... A47K 5/1217; A47K 5/1202; H02J 50/005; H02J 50/30; H04B 10/807
See application file for complete search history.

(56) References Cited

U.S. PATENT DOCUMENTS

| | | | | |
|---|---|---|---|---|
| 9,705,606 | B2 * | 7/2017 | Alpert | H04B 10/11 |
| 10,454,593 | B2 * | 10/2019 | Alpert | H01S 3/08 |
| 2010/0237096 | A1 * | 9/2010 | Wegelin | H02J 50/20 |
| | | | | 222/52 |
| 2012/0245729 | A1 * | 9/2012 | Wegelin | G01F 15/068 |
| | | | | 700/231 |
| 2017/0008407 | A1 * | 1/2017 | Porras | B60H 1/00278 |
| 2017/0294809 | A1 * | 10/2017 | Slepoy | H02J 50/40 |

* cited by examiner

*Primary Examiner* — Donnell A Long
(74) *Attorney, Agent, or Firm* — Calfee, Halter & Griswold LLP

(57) ABSTRACT

Exemplary dispensers that receive power from a wireless focused power signal and methods of charging such dispensers are disclosed herein. An exemplary dispenser for dispensing soap or sanitizer includes a housing, a receptacle for retaining a supply of soap or sanitizer, a processor, and a focused energy signal receiver. The focused energy signal receiver includes a reflector for reflecting at least a portion of the focused energy signal back to a transmission source and a converter for converting at least a portion of the focused energy signal into an output voltage. The dispenser further includes charge control circuitry and one or more capacitors. The charge control circuitry monitors the output voltage of the converter. If the output voltage of the converter is above a threshold, the one or more capacitors receive a charging current.

20 Claims, 9 Drawing Sheets

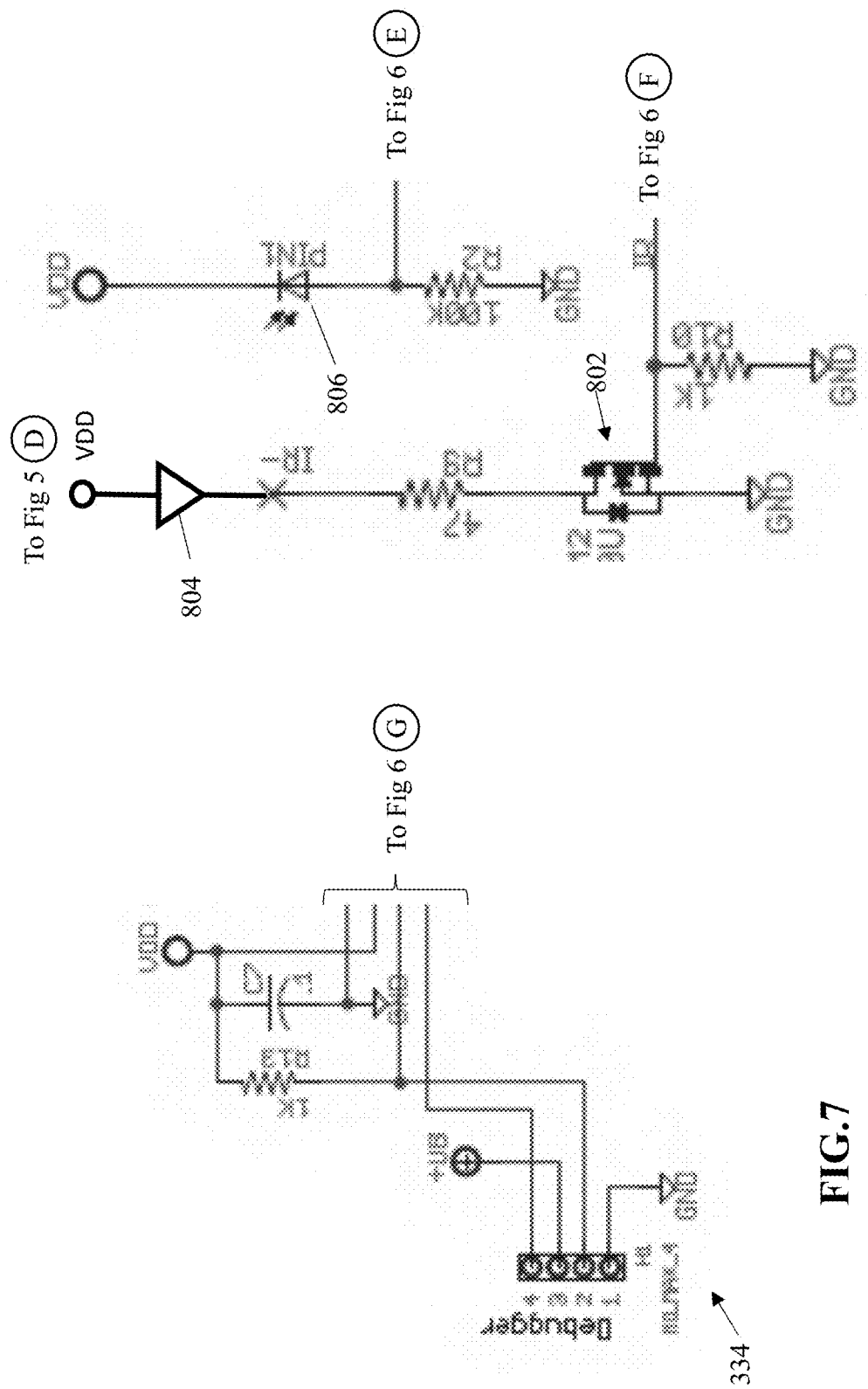

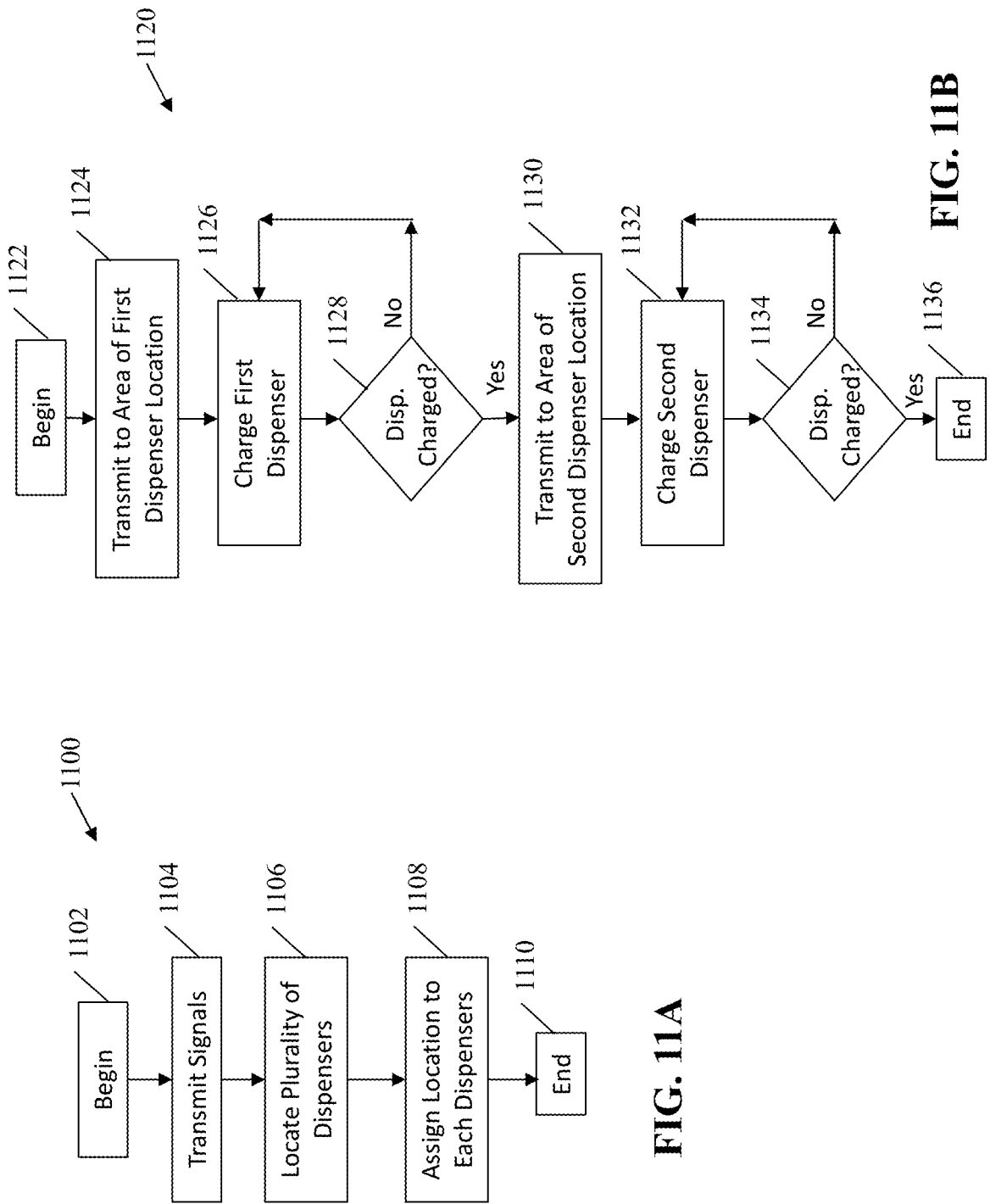

TOUCH FREE DISPENSERS POWERED BY FOCUSED ENERGY SIGNALS

RELATED APPLICATIONS

This application claims priority to, and the benefits of, U.S. Provisional Patent Application Ser. No. 62/957,362, tilted TOUCH FREE DISPENSERS POWERED BY FOCUSED ENERGY SIGNALS, which was filed on Jan. 6, 2020 and which is incorporated herein by reference in its entirety.

TECHNICAL FIELD

The present invention relates generally to touch free dispenser systems and more particularly to touch free dispensers that are configured to receive power wirelessly through one or more focused energy signals.

BACKGROUND OF THE INVENTION

Most touch free dispensers are powered by a plurality of batteries, such as 3-4 "D" or "C" size batteries. As the touch-free dispenser is used, the battery power is depleted and a maintenance worker must periodically open up the dispenser and replace the batteries. This requires maintenance personnel to stock batteries, identify when the touch-free dispenser batteries are running low, replace the batteries and dispose of the old batteries. Several patent applications have attempted to overcome problems associated with battery powered dispensers by using "solar" power. The disclosed solar power dispensers are not commercially feasible, do not provide enough power and/or require very large solar power arrays. Moreover, dispensers are typically located in areas that have limited natural light and often in areas where the lights automatically shut off when no movement is detected in the room making it impossible to economically utilize solar power cells to power the dispensers. Another alternative to battery powered touch-free dispensers is to provide hard wired power drops to touch-free dispensers, however, this solution impractical and cost prohibitive. Accordingly, there is a need for touch-free dispensers that do not require batteries that need to be replaced, do not rely on solar panels or that do not need a hard wired power drop, yet have the ability to readily receive power and reliably dispense product.

SUMMARY

Exemplary dispensers that receive power from a wireless focused power signal and methods of charging such dispensers are disclosed herein. An exemplary touch-free dispenser for dispensing soap or sanitizer includes a housing, a receptacle for retaining a supply of soap or sanitizer, a processor, and a focused energy signal receiver. The focused energy signal receiver includes a reflector for reflecting at least a portion of the focused energy signal back to a transmission source and a converter for converting at least a portion of the focused energy signal into an output voltage. The touch-free dispenser further includes charge control circuitry and one or more capacitors. The charge control circuitry monitors the output voltage of the converter. If the output voltage of the converter is above a threshold, the one or more capacitors receive a charging current. A motor for causing a product to be dispensed is also provided. The motor receives power from the one or more capacitors to dispense the soap or sanitizer.

Another exemplary electronic dispenser includes a housing, a receptacle for retaining a supply of product, a processor, and a focused energy signal receiver. The dispenser further includes a reflector for reflecting at least a portion of the focused energy signal back to a transmission source, a converter for converting at least a portion of the focused energy signal into an output voltage, charge control circuitry and one or more energy storage devices. The charge control circuitry monitors the output voltage of the converter. If the output voltage of the converter is above a threshold, the one or more energy storage devices receive a charging current.

Another exemplary dispenser includes a housing, a receptacle for retaining a supply of product, a processor, a reflector for reflecting at least a portion of a focused energy signal, a converter for converting at least a portion of the focused energy signal into an output voltage, charge control circuitry and one or more energy storage devices. The charge control circuitry monitors the output voltage of the converter. If the output voltage of the converter is above a threshold, the one or more energy storage devices receive a charging current. A motor for receiving power from the energy storage device to dispense product is also provided.

Another exemplary dispenser includes a housing, a receptacle for retaining a supply of product, a processor, a reflector for reflecting at least a portion of a focused energy signal, a converter for converting at least a portion of the focused energy signal into an output voltage, charge control circuitry, and one or more capacitors. The charge control circuitry monitors the output voltage of the converter. If the output voltage of the converter is above a threshold, the one or more capacitors receive a charging current.

Another exemplary dispenser includes a housing, a receptacle for retaining a supply of product, a processor, a focused energy signal receiver, a converter for converting the focused energy signal into an output voltage, charge control circuitry, and one or more energy storage devices. The charge control circuitry monitors the output voltage of the converter. If the output voltage of the converter is above a threshold, the one or more energy storage devices receive a charging current. If the output voltage of the converter is below a threshold, the one or more energy storage devices do not receive a charging current.

Another exemplary electronic dispenser includes a housing, a receptacle for retaining a supply of product, a processor, a focused energy signal receiver, a converter for converting the focused energy signal into an output voltage, charge control circuitry, one or more energy storage devices and back flow prevention circuitry that allows current to flow from the converter to the charge control circuitry and prevents current from flowing from the one or more energy storage devices to the converter. The charge control circuitry monitors the output voltage of the converter. If the output voltage of the converter is above a threshold, the one or more energy storage devices receive a charging current and if the output voltage of the converter is below a threshold, the one or more energy storage devices do not receive a charging current.

Exemplary methodologies and logic diagrams for charging and powering touch-free dispensers are disclosed herein. An exemplary method of powering a dispenser includes transmitting a focused energy signal toward the dispenser, reflecting at least a portion of the focused energy signal back to the transmitter, converting at least a portion of the focused energy signal to a voltage output, charging an energy storage device after the voltage output is above a selected threshold, detecting an object in a sensing area, and causing a motor to receive current from the energy storage device to dispense a product from the dispenser.

Another exemplary method of charging a plurality of dispensers includes transmitting a plurality of focused power signals into an area, receiving, by the transmitter, one or more signals reflected back from a plurality of dispensers, determining one or more charge priorities for the plurality of dispensers, and charging the plurality of dispensers in a selected order as a function of the one or more charge priorities.

Another exemplary method of charging a plurality of dispensers includes using a power signal transmitter to transmitting a plurality of focused power signals into an area, locating a plurality of dispensers within the area, and storing a general location of the plurality of dispensers in memory. The methodology further includes subsequently transmitting focused power signals only to the general locations of the plurality of dispensers, and charging one or more of the plurality of dispensers.

BRIEF DESCRIPTION OF THE DRAWINGS

These and other features and advantages of the present invention will become better understood with regard to the following description and accompanying drawings in which:

FIGS. 4-9 are enlarged portions of the exemplary electrical schematic design of FIG. 3;

FIG. 11A is an exemplary methodology or logic diagram for mapping a general location of a plurality of dispensers and FIG. 11B is an exemplary methodology or logic diagram for charging a plurality of dispensers by searching for the dispensers in the previously mapped general locations.

DETAILED DESCRIPTION

The following includes definitions of exemplary terms used throughout the disclosure. Both singular and plural forms of all terms fall within each meaning. Except where noted otherwise, capitalized and non-capitalized forms of all terms fall within each meaning:

"Circuit communication" as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

Also, as used herein, voltages and values representing digitized voltages are considered to be equivalent for the purposes of this application, and thus the term "voltage" as used herein refers to either a signal, or a value in a processor representing a signal, or a value in a processor determined from a value representing a signal.

"Signal", as used herein includes, but is not limited to one or more electrical signals, analog or digital signals, one or more computer instructions, a bit or bit stream, or the like.

"Logic," synonymous with "circuit" as used herein includes, but is not limited to hardware, firmware, software and/or combinations of each to perform a function(s) or an action(s). For example, based on a desired application or needs, logic may include a software controlled microprocessor or microcontroller, discrete logic, such as an application specific integrated circuit (ASIC) or other programmed logic device. Logic may also be fully embodied as software. The circuits identified and described herein may have many different configurations to perform the desired functions. The exemplary methodologies provide instructions for creating logic to control desired functions.

Values identified in the detailed description may be exemplary and may be different as needed for a particular dispenser and/or refill design. Accordingly, the inventive concepts disclosed and claimed herein are not limited to the particular values or ranges of values used to describe the embodiments disclosed herein.

Figure 1:
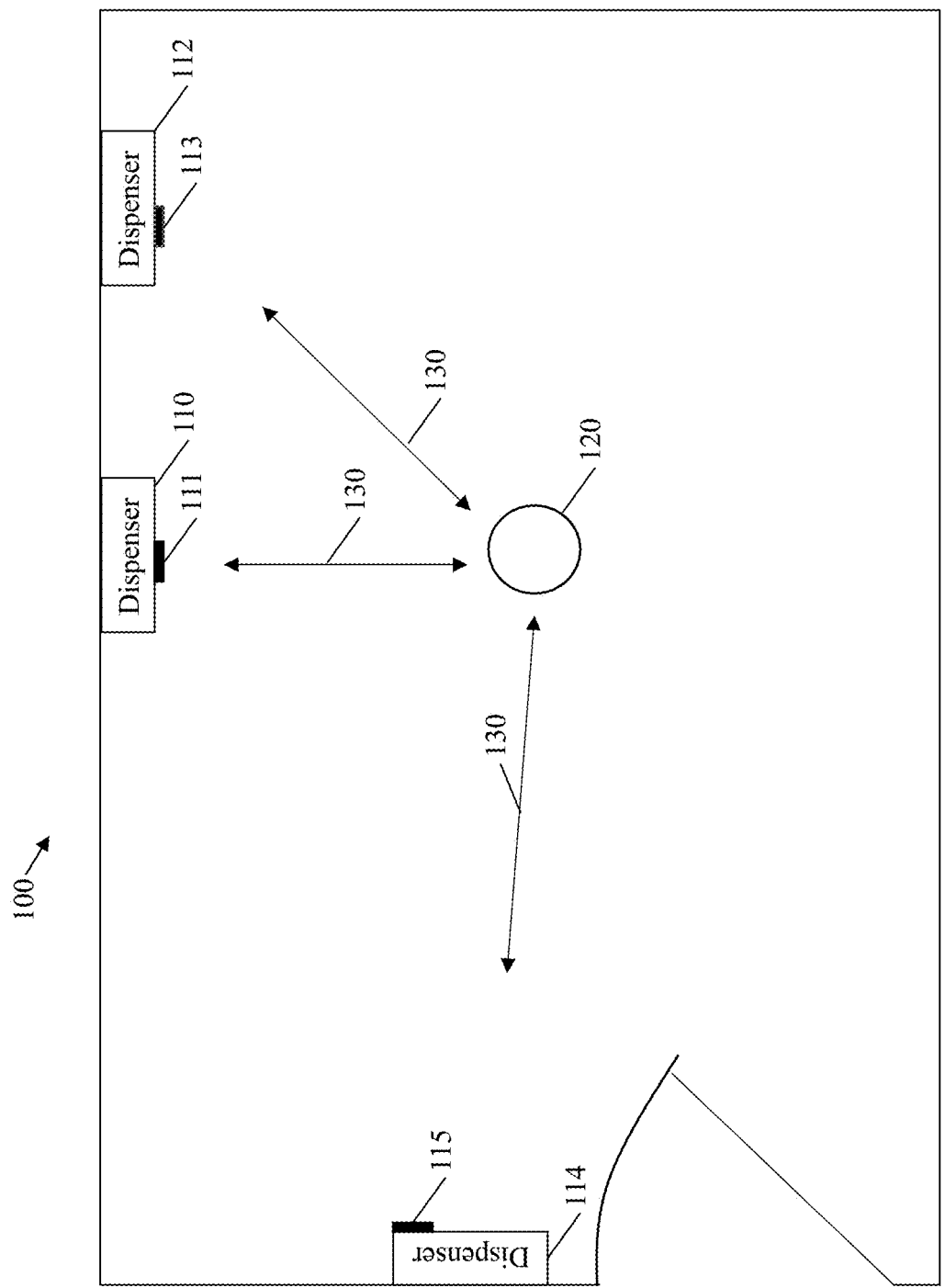
FIG. 1 a schematic diagram of a room having a power transmitter for transmitting focused power signals and a plurality of dispensers for receiving focused power signals.

FIG. 1 is an exemplary embodiment of a room 100 having a plurality of dispensers 110, 112, 114. Room 100 may be any type of room, such as, for example, a restroom, a hospital room, a hospital ward, a classroom, etc. Dispensers 110, 112, 114 are preferably touch-free dispensers that detect the presence of a user's hand and dispense a dose of fluid, however, they may be other types of dispensers, such as, for example, paper towel dispensers. Exemplary dispensers are shown and described in U.S. Pat. No. 7,837,066 titled Electronically Keyed Dispensing System And Related Methods Utilizing Near Field Response; U.S. Pat. No. 9,172,266 title Power Systems For Touch-Free Dispensers and Refill Units Containing a Power Source; U.S. Pat. No. 7,909,209 titled Apparatus for Hands-Free Dispensing of a Measured Quantity of Material; U.S. Pat. No. 7,611,030 titled Apparatus for Hands-Free Dispensing of a Measured Quantity of Material; U.S. Pat. No. 7,621,426 titled Electronically Keyed Dispensing Systems and Related Methods Utilizing Near Field Response; and U.S. Pat. No. 8,960,498 titled Touch-Free Dispenser with Single Cell Operation and Battery Banking; all of which are incorporated herein by reference in their entirety. In addition, in some embodiments, sequentially activated diaphragm pumps are utilized in the touch free dispensers. Exemplary sequentially activated diaphragm pumps and associated dispensers are shown and described in U.S. Pat. Nos. 9,943,196, 10,065, 199, 10,080,466, 10,080,467, 10,143,339, and 10,080,468, which are incorporated herein in their entirety by reference. These dispensers may be modified with the innovative power systems described herein.

In some embodiments, the dispensers are manual dispensers that include one or more electronic modules that require power to operate. The electronic modules, may be, for example, compliance modules that provide a compliance system (not shown) with hand-hygiene metrics, such as, for example, dispense events, user identification information, or the like. An exemplary compliance monitoring system is shown and disclosed in U.S. patent application Ser. No. 14/789,595, titled Methods And Systems For Improving Hand Hygiene, which is incorporated herein by reference. Dispensers 110, 112, 114 may all be the same type of dispensers, or may be different types of dispensers. For example, dispenser 110 may be a soap dispenser, dispenser 112 may be a paper towel dispenser, and dispenser 114 may be a hand sanitizer dispenser.

In this exemplary embodiment, dispensers 110, 112, 114 require power to operate and dispense product. In this exemplary embodiment, dispensers 110, 112, 114 do not have traditional batteries that may be changed when they no longer have sufficient power to operate the dispenser and the dispensers are not powered by hard wire drops. Rather the dispensers 110, 112, 114 have a chargeable storage device (not shown), such as, for example, one or more capacitors, a re-chargeable battery, or the like. Unlike traditional touch-free dispensers that contain disposable batteries that have sufficient power to power the dispensers for very long time, such as, for example, through multiple refill units of a dispensable fluid, or in some cases, the designed life of the dispenser, the chargeable storage devices do not have sufficient power storage capabilities to last over the life of a refill unit having dispensable fluid, and certainly not over the life of the dispensers. In some embodiments, the chargeable storage device (not shown) stores enough power to power the dispenser less than about 100 times. In some embodiments, the chargeable storage device typically stores enough power to power the dispenser less than about 90 times. In some embodiments, the chargeable storage device stores enough power to power the dispenser less than about 80 times. In some embodiments, the chargeable storage device stores enough power to power the dispenser less than about 70 time. In some embodiments, the chargeable storage device stores enough power to power the dispenser less than about 60 times. In some embodiments, the chargeable storage device stores enough power to power the dispenser less than about 50 times. In some embodiments, the chargeable storage device stores enough power to power the dispenser less than about 40 times. In some embodiments, the chargeable storage device stores enough power to power the dispenser less than about 30 times. In some embodiments, the chargeable storage device stores enough power to power the dispenser less than about 20 times. In some embodiments, the chargeable storage device stores enough power to power the dispenser less than about 10 times.

In all of the exemplary embodiments, the chargeable storage device needs to be periodically charged. The chargeable storage device may be charged as a function of usage, that is, for example, charged once every 20 dispenses. The chargeable storage device may be charged as a function of the charge on the energy storage device, that is, for example, the chargeable storage device may be charged when the voltage of the energy storage device falls below 50% of a full charge. In some embodiments, the chargeable storage device is charged, or "topped off" several times an hour.

Dispensers 110, 112, 114 include receivers 111, 113, 115 for receiving a focused energy signal 130 from a transmitter 120. Preferably, the focused energy signal 130 is collected by receivers 111, 113, 115 to provide power to charge the internal energy storage device (not shown). In some embodiments, the dispenser 110, 112, 114 does not store energy on an internal energy storage device and operates directly on power from the focused energy signal 130 as it is collected by receivers 111, 113, 115. In dispensers that do not have energy storage circuitry, the circuitry described as charge control circuitry is still used, however, rather than provide current to the energy storage circuitry, the current is provided directly to the motor drive circuitry.

In some embodiments, dispensers 110, 112, 114 have the ability to communicate with transmitter 120 in addition to receiving the focused energy signal 130 that provides power to the receivers 111, 113, 115. In some embodiments, the communications between the dispensers 110, 112, 114 and transmitter 120 is accomplished by varying and/or pulsing the focused energy signal 130. The communications between the dispensers 110 and transmitter 120 may be bidirectional or unidirectional.

In some embodiments, the dispensers 110, 112, 114 communicate one or more of the following: the charge of the internal energy storage device; a location of the dispenser; a distance the dispenser is located from the transmitter 120; one or more hierarchal factors that may be used to determine which dispenser receives priority in receiving an energy signal 130; usage history; throughput history; charging history; a request for charging; a priority request for charging; and the like.

Exemplary transmitting and receiving devices for transmitting and receiving focused power signals are shown and described in U.S. Pat. No. 9,705,606 titled Directional Light Transmitters and Receiver; U.S. Pat. No. 10,193,297 titled Distributed Coupled Resonator Laser; U.S. Pat. No. 10,454, 593 titled Distributed Optical Resonator with Thin Receiver Unit; U.S. Pat. Pub. No. 2017/0294809 titled System for Optical Wireless Power Supply; each of which are incorporated herein by reference in their entirety.

In some exemplary embodiments, transmitter 120 includes a three dimension retroreflector array, gain material, electrical excitation input and a detector. In this exemplary embodiment, receivers 111, 113, 115 include a partially reflecting retroreflector, a monitoring device, and a conversion device, which may be referred to herein as a converter. During operation, transmitter 120 broadcasts a plurality of photons, or energy signals in a plurality of directions. When the energy signals contact the receivers 111, 113, 115, at least a portion of the energy signal is reflected back to the transmitter 120 along an incident photon path. The reflected energy signal is amplified and sent along the incident photon path back to the receivers 111, 113, 115. At least a portion of the energy signal is reflected back the transmitter 120 and the process is repeated. After a period of time the signal becomes strong enough to transmit a focused power signal 130. At least a portion of the focused power signal 130 is directed to the conversion device in the receiver. In addition, in some embodiments, communication signals are transmitted between the transmitter 120 and the receivers 111, 113, 115. In some embodiments, the communication signals are created by varying and/or modulating the power signal 130. Power from the power signals 130 received by the conversion device (not shown) is transmitted is used to charge one or more energy storage devices (not shown) in the dispensers 110, 112, 114.

Figure 2:
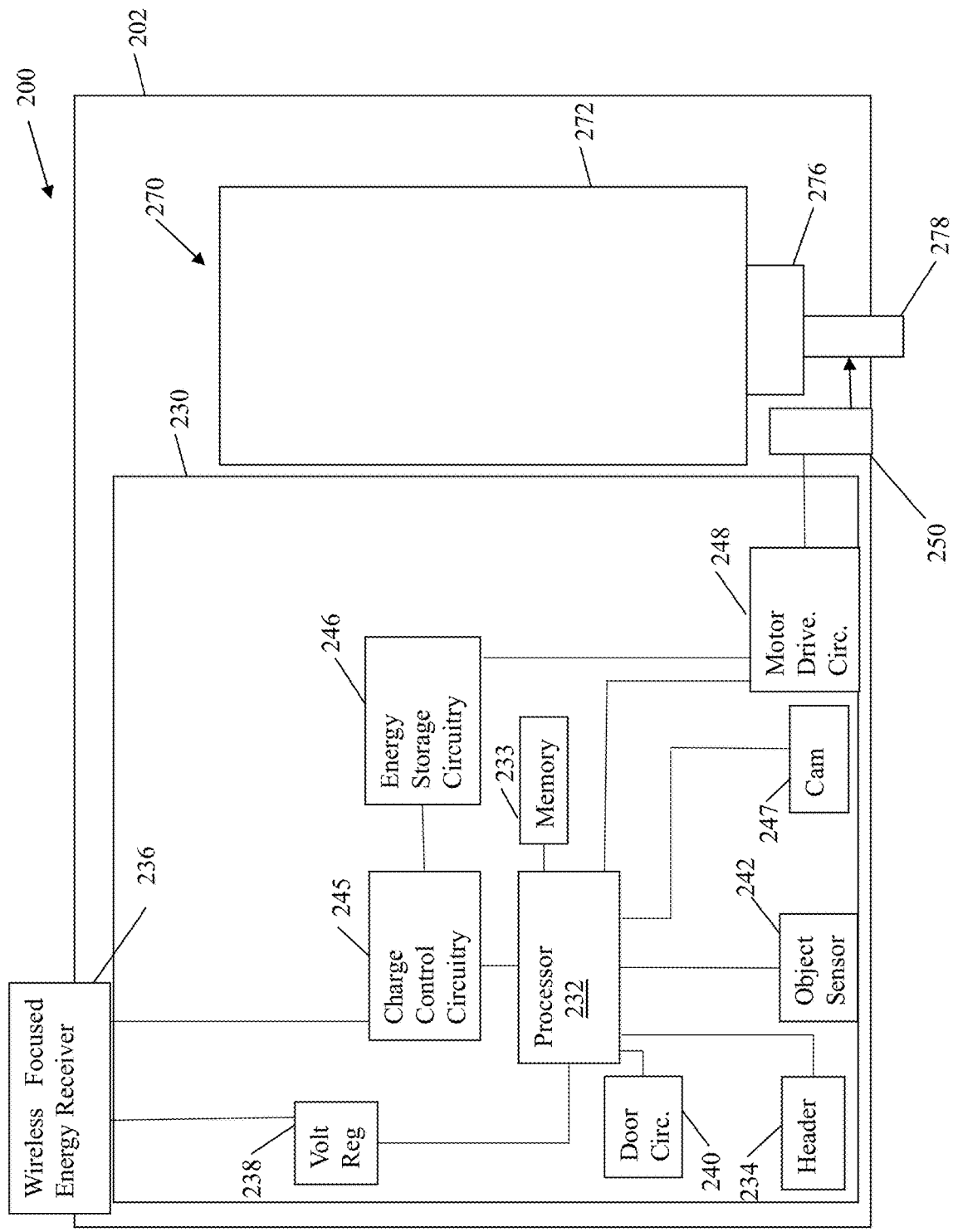
FIG. 2 is a generic illustrative schematic of an exemplary dispenser having a power system that receives power from focused energy signals.

FIG. 2 illustrates an exemplary touch-free dispenser 200 having a receiver 236 for receiving a focused energy signal from a transmitter (not shown). The focused energy signal provides power for dispenser 200. The receiver 236 may be located on a face of the dispenser housing 202, on the top of dispenser housing 202. The receiver 236 may be partially located within the housing 202. In some embodiments, receiver 236 may be mounted remotely from the dispenser housing 202. In some embodiments, the receiver 236 includes at least one partially reflective retro-reflector (not shown), a conversion device (not shown), and an optional monitoring device (not shown). In some embodiments, receiver 236 is located on an adjustable mounting bracket (not shown). An adjustable mounting bracket may be used to align the receiver 236 with a power transmitter (not shown) so that the focused energy signal may have a direct "line-of-sight" path between the transmitter and receiver 236.

Located within housing 202 is a system circuitry 230. System circuitry 230 may be on a single circuit board or may be on multiple circuit boards. In addition, some of the circuitry may not be on a circuit board, but rather individually mounted and electrically connected to the other components as required. In this embodiment, system circuitry 230 includes a processor 232, memory 233, a header 234, a voltage regulator 238, door switch circuitry 240, an object sensor 242, a cam 247, motor drive circuitry 248, motor 250, charge control circuitry 245, and energy storage circuitry 246.

In addition, preferably located at least partially within housing 202 is a reservoir 270. Reservoir 270 includes a container 272. In some embodiments, reservoir 270 includes a pump 272 and outlet nozzle 278. Container 272 may be removable and replaceable. In some embodiments, the pump 276 and outlet nozzle 278 are removable and replaceable with container 272. In some embodiments, pump 276 and outlet nozzle 278 are fixed to the housing 202 and remain in place when container 272 is removed and replaced. If the container 272, pump 276, and outlet nozzle 278 are removed and replaced together, that may be referred to herein as a refill unit. If the pump 276 and outlet nozzle remain in place, the container 272 may be referred to herein as a refill unit. If the container 272 is the refill unit, typically the refill unit will include at least a cap (not shown) and sealing member (not shown) for removably connecting to the dispenser and placing the fluid within the container in fluid communication with the pump, and disconnecting therefrom without leaking fluid.

Processor 232 may be any type of processor, such as, for example, a microprocessor or microcontroller, discrete logic, such as an application specific integrated circuit (ASIC), other programmed logic device or the like. Processor 232 is in circuit communication with optional header 234. Header 234 is an "in-circuit" connection port. A user may use header 234 to connect to system circuitry 230 to program the circuitry, run diagnostics on the circuitry and/or retrieve information from the circuitry through header 234. Processor 232 is in circuit communication with memory 233. Memory 233 may be any type of memory, such as, for example, Random Access Memory (RAM); Read Only Memory (ROM); programmable read-only memory (PROM), electrically programmable read-only memory (EPROM), electrically erasable programmable read-only memory (EEPROM), magnetic disk or tape, optically readable mediums including CD-ROM and DVD-ROM, or the like, or combinations of different types of memory. In some embodiments, the memory 233 is separate from the processor 232, and in some embodiments, the memory 233 and processor 232 are integrated together. Processor 232 controls the operation of dispenser 200.

Receiver 236 is in circuit communication with voltage regulator circuitry 238. In some exemplary embodiments, voltage regulator circuitry 238 provides regulated power to processor 232, object sensor 242, cam 247 and door circuitry 240.

In addition, processor 232 is in circuit communication with optional door circuitry 240 so that processor 232 knows when the dispenser 200 door (not shown) is open/closed. In some embodiments, processor 232 will not allow the dispenser 200 to dispense a dose of fluid if the door is open. Door circuitry 240 may be any type of circuitry, such as, for example, a mechanical switch, a magnetic switch, a proximity switch or the like.

Processor 232 is also in circuit communication with an object sensor 242 for detecting whether an object is present in the dispense area. Object sensor 242 may be any type of passive or active object sensor, such as, for example, an infrared sensor and detector, a proximity sensor, an imaging sensor, a thermal sensor or the like.

Processor 232 is also in circuit communication with motor drive circuitry 248. Motor drive circuitry 248 causes a motor 250 (and any associated gearing) to operate pump 276 in order to dispense fluid from container 272 out of outlet 278.

In addition, optional cam 247 is in circuit communication with processor 232 and provides processor 232 with information relating to the pump, gearing, or motor, such as, for example, the end of stroke of the pump, a number of revolutions of the motor, or the like, so that the processor 232 can determine when to stop the motor and associated gearing. The optional cam 247 may include, for example, an encoder, a physical switch, a magnetic switch, software algorithm or the like.

System circuitry 130 also includes charge control circuitry 245 and energy storage circuitry 246. Energy storage circuitry 246 includes any circuitry that may be charged up and store energy for later use. In some exemplary embodiments, energy storage circuitry 246 may be one or more capacitors. In some exemplary embodiments, energy storage circuitry 246 may be two capacitors. In some exemplary embodiments, energy storage circuitry 246 may be one or more chargeable chemical cells, such as, for example, one or more rechargeable battery cells.

Charge control circuitry 245 controls the charging of energy storage circuitry 246. In some embodiments, charge control circuitry 245 includes circuitry for preventing the back flow of current from energy storage circuitry 246 to receiver 236. In addition, charge control circuitry 245 includes circuitry for preventing the charging of energy storage circuitry 246 until the output of the receiver 236 circuitry is above a threshold voltage. In some embodiments, the threshold voltage is about 3 volts. Once the output of the receiver 236 is at or above the selected threshold voltage, charge control circuitry 245 allows current to flow into the energy storage circuitry 246. In some embodiments, processor 232 monitors the voltage of the receiver 236 output. In some embodiments, processor 232 monitors the charge or voltage on the energy storage device 246.

During operation, the receiver 236 couples with a transmitter (not shown) and a link is established between the receiver 236 and the transmitter. Once the link is established, the receiver begins to generate power through a conversion device (not shown) in receiver 236. Voltage regulator 238 receives the voltage output from the receiver 236, and provides regulated voltage to the processor 232. When voltage output on the receiver 236 reaches the threshold voltage, charge control circuitry 245 allows current to flow to energy storage circuitry 246 to charge the energy storage circuitry 246. Processor 232 monitors the charge in the energy storage circuitry 246 and once sufficiently charged, the dispenser 200 may operate.

When the processor 232, through object sensor 242, determines that an object is within the dispense zone, the processor 232 causes the motor drive circuitry 248 to allow current to flow from the energy storage circuitry 246 to motor 250. Operation of the motor 250 causes the pump 276 to dispense a dose of fluid through the outlet nozzle 228. Once the dispenser 200 dispenses a dose of fluid, the processor 232 causes the motor drive circuitry to stop operating the motor. In some embodiments, optional cam 247 is used to provide input back to the processor 232 that the proper sized dose of fluid has been dispensed. In some embodiments, a timer is used to determine when the proper dose of fluid has been dispensed. In some embodiments, a current draw or voltage peak is used to determine when the proper sized dose of fluid has been dispensed.

In some embodiments, the processor 232 provides communication data to receiver 236 that is transmitted to the transmitter (not shown). In some embodiments, the communication data is transmitted by varying the focused power signal being received/transmitted between the transmitter (not shown) and the receiver 236.

Figure 3:
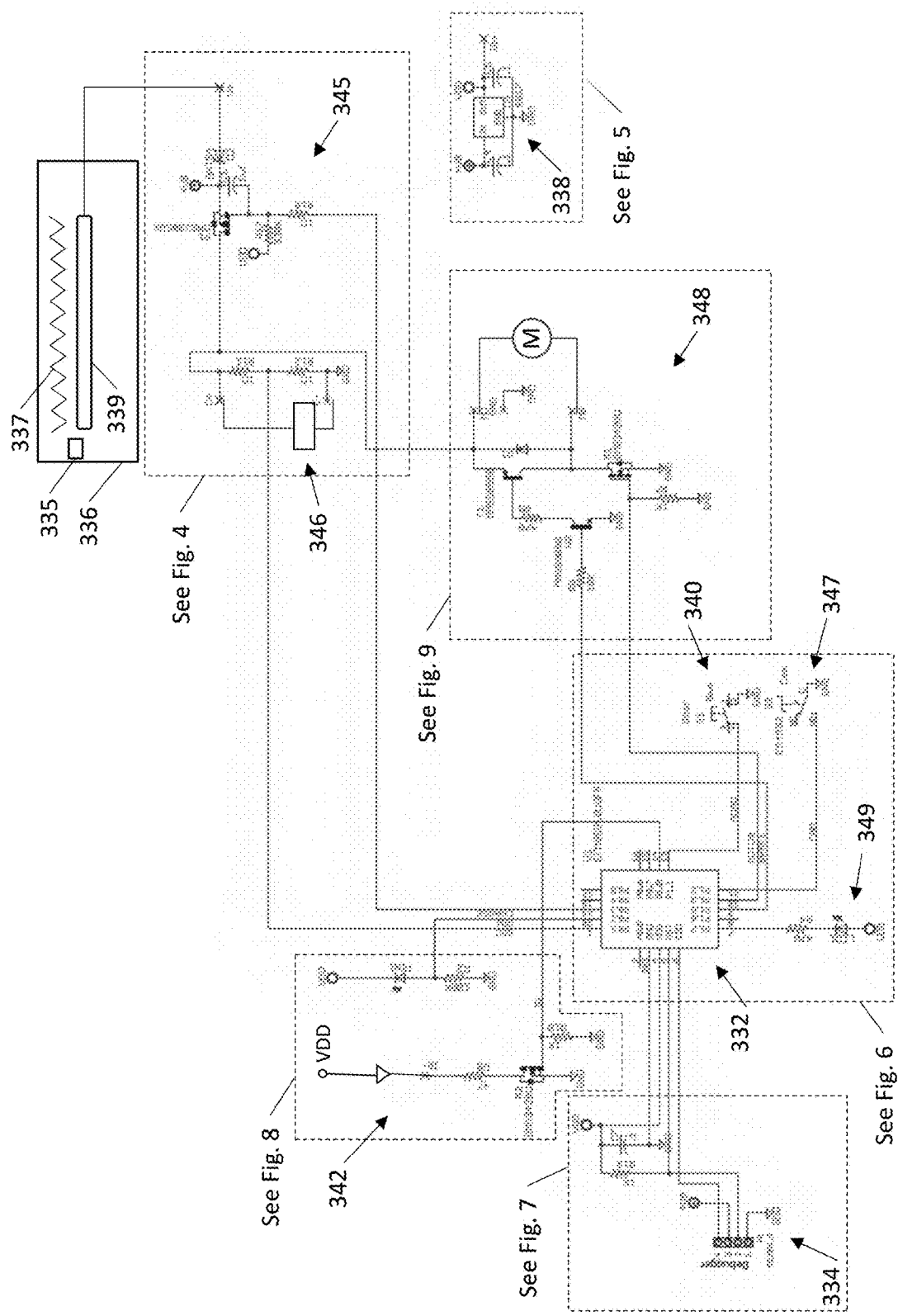
FIG. 3 is an electrical schematic design for an exemplary touch free dispenser having a power system that receives its power from focused power signals.

FIG. 3 is a schematic diagram of a system circuitry 300 for an exemplary dispenser configured to receive its power from wireless focused power signals. FIGS. 3-9 are enlarged portions of the system circuitry 300. System circuitry 300 includes a receiver 336. Receiver 336 includes a reflective retroreflector 337, a conversion device 339, such as, for example, a photovoltaic array. Receivers 336 also includes a monitoring device 335 that may be used to communicate with the transmitter (not shown). The receiver 336 is configured to receive one or more focused power signals from a transmitter (not shown). In this exemplary embodiment, the focused power signals are established as described above, by linking with the transmitter (not shown) and building up a reflected signal until a sufficient focused signal is developed. Conversion device 339, which may be referred to herein as a converter, receives at least a portion of the focused power signals and converts the focused power signal to usable power once the output voltage reaches a threshold voltage as described below. The usable power is converted to an output voltage to charge control circuitry 345, voltage regulator 338, and energy storage device 346.

Figures 4, 5:
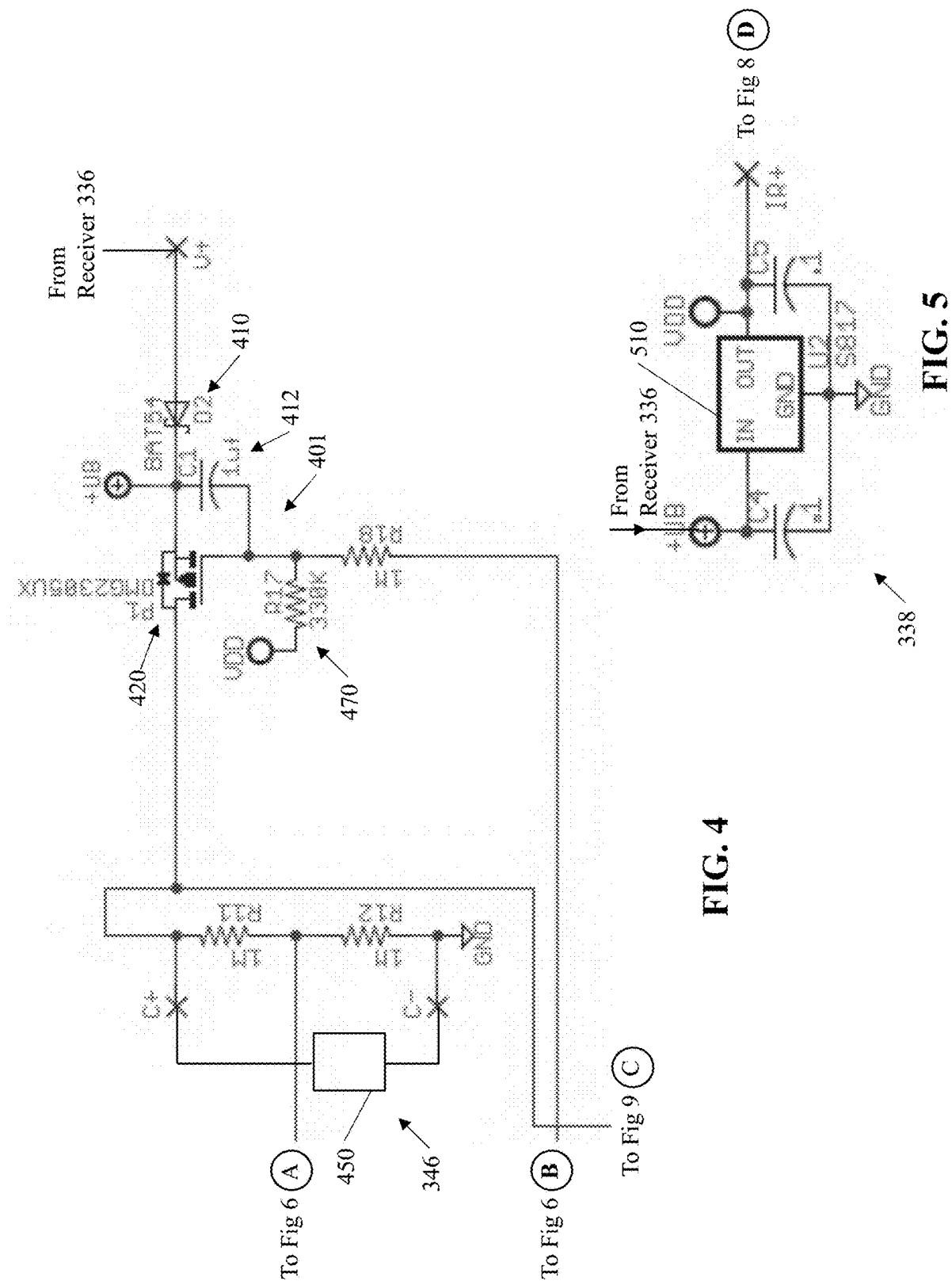

Charge control circuitry 345 includes voltage threshold level circuitry 401 to prevent charging of the energy storage circuitry 345 until the voltage output from receiver 336 is above a selected threshold. In this exemplary embodiment, the voltage threshold level circuitry 401 includes a capacitor 412, a FET 420, and voltage divider 470. FET 420 includes a parasitic diode. The components are connected as shown in FIGS. 3 and 4. Charge control circuitry 345 is configured to prevent a load from being present on receiver 336 while the receiver 336 is connecting to a transmitter (not shown) and until the focused power signal being transmitted from the transmitter reaches a high enough intensity to provide a voltage output at a selected threshold voltage. It is essential for charge control circuitry 345 to prevent a load being applied to the output of receiver 336 prior to the receiver 336 powering up and generating a sufficient voltage output threshold. The voltage output of receiver 336 is monitored by processor 332.

In addition, in this exemplary embodiment, charge control circuitry 345 includes back flow prevention circuitry 410, which presents power from being drawn from the system back into the receiver 336. In this exemplary embodiment, back flow prevention circuitry 410 is a Schottky diode. In some embodiments, failure to prevent back flow of power into receiver 336 results in draining of power from the energy storage circuitry 346 when the receiver 336 is not receiving a focused power signal. Although the back flow prevention circuitry 410 is shown associated with the charge control circuitry 345, the back flow prevention circuitry 410 may be separate from the charge control circuitry 345.

Once the receiver 336 is providing a voltage output that is above a threshold voltage, charge control circuitry 345 allows current to flow into energy storage circuitry 346. In this exemplary embodiment, charge control circuitry 345 allows current to flow into energy storage circuitry 346 by opening FET 420 and energy storage circuitry 246 begins to charge energy storage device 450. In this exemplary embodiment, energy storage device 450 is two capacitors placed in series, however, energy storage device 450 may be more or fewer capacitors, or other energy storage devices that can receive energy and provide that energy at a later time. In this exemplary embodiment, processor 332 monitors the charge on energy storage device 450.

The voltage output from receiver 336 is provided to voltage regulator circuitry 338 (FIG. 5). The voltage regulator circuitry 338 includes a regulator 510, which provides an output VDD. Output VDD may be used to power processor 332, indicator light 349, and object sensor 342.

Figure 6:
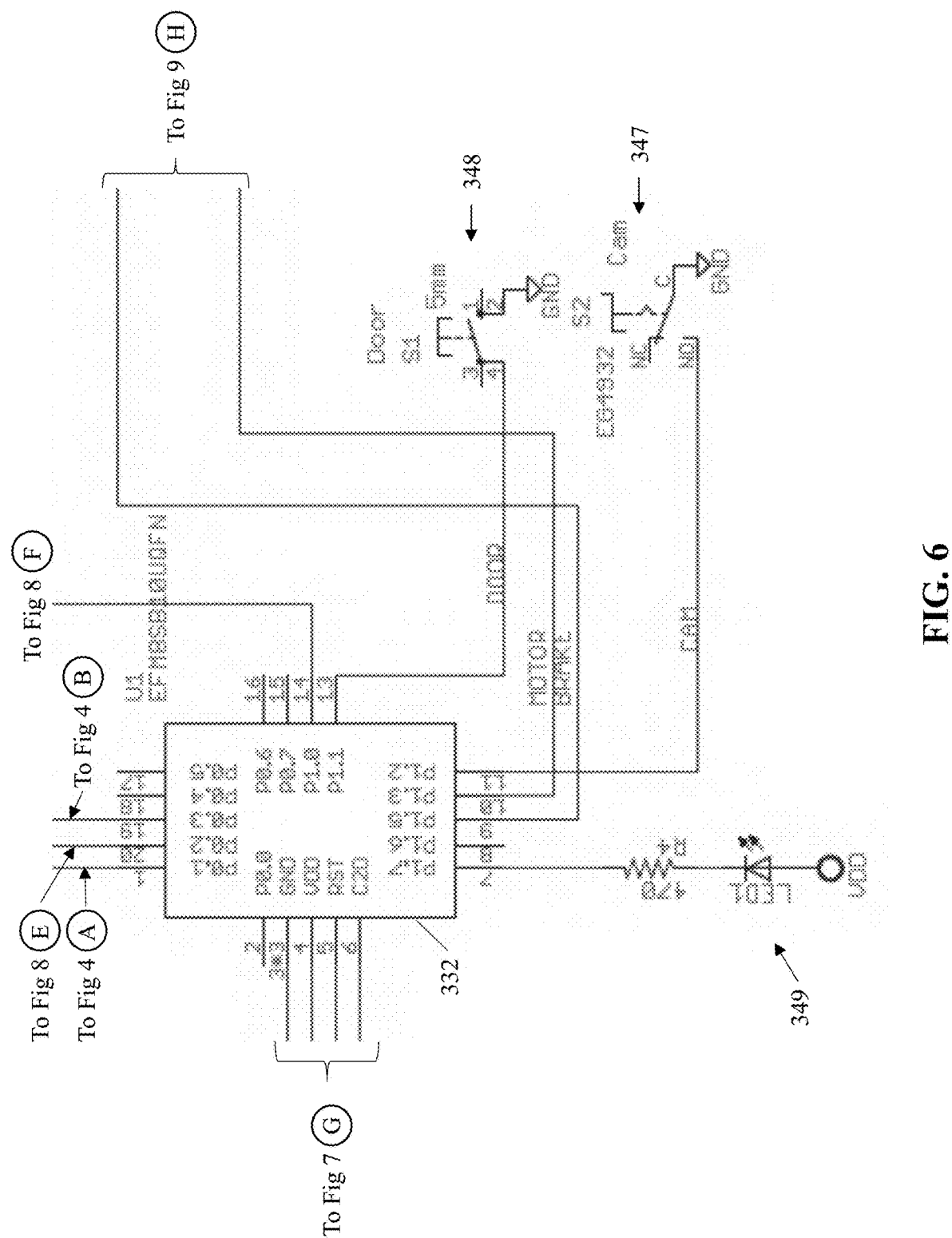

FIG. 6 illustrates an exemplary processor 332. Processor 332 receives power on pins 3 and 4 and communications from header 334 on pins 5 and 6. In addition, processor 332 has several inputs: an input for receiving the charge on energy storage device 450 on pin 0.1, an input for detecting the presence of an object from object sensor 342 on pin 0.2, an input for receiving a voltage indicative of the voltage output of the receiver 336 on pin 3, an input for receiving a position from the cam 347 on pin 1.2, and an input for receiving a door status from switch 348 on pin 1.3. In addition, processor 332 has several outputs as well: an output for illuminating a status LED 349 on pin 1.7, an output for controlling brake circuitry on pin 1.5 an output for controlling the motor circuit on pin 1.3 and an output for controlling the object sensor on pin 1.4.

FIG. 7 illustrates the exemplary debugger 334 and power input for processor 332. FIG. 8 illustrates the exemplary object sensor 342. Object sensor 342 includes a switch 802 for turning on and off an infrared emitter 804. In the exemplary embodiment, the switch 802 is a FET controlled by processor 332. Object sensor 342 includes a detector 806 that provides an output to processor 332 indicative of whether or not an object is present in the sensing area.

Figure 9:
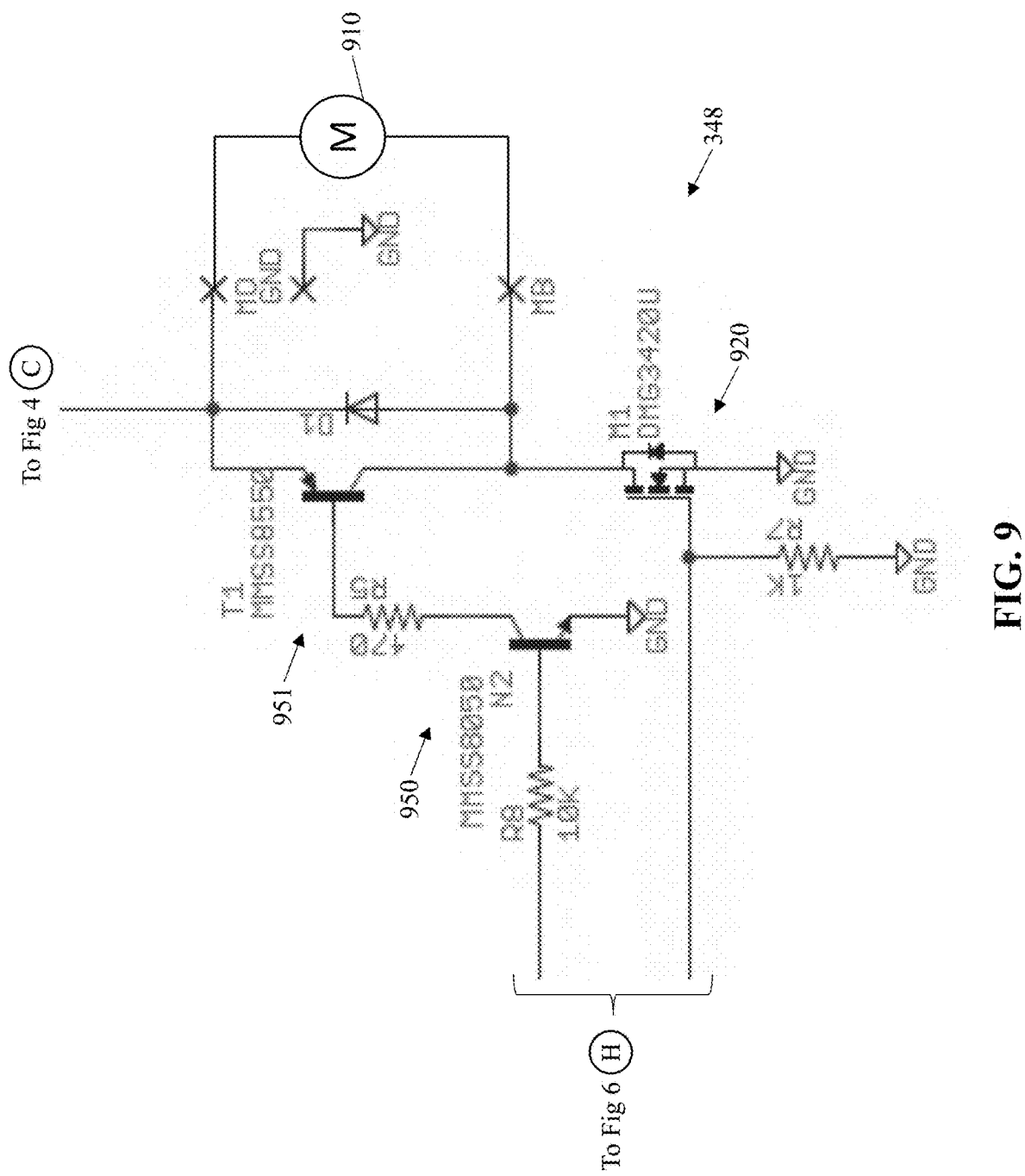

FIG. 9 illustrates the exemplary embodiment of the motor drive circuitry 348. Motor drive circuitry provides power to motor 910 to dispense a product. Motor drive circuitry receives power form energy storage device 450. Processor 332 controls a switch 920, which in this exemplary embodiment is an FET, to start and stop the motor. Processor 332 also controls an optional braking circuit by opening and closing switch 950 (and associated switch 951), which in this exemplary embodiment are transistors. A signal diode 952 is also used in the optional brake circuit.

During operation a transmitter (not shown) broadcasts a plurality of signals out into a general area. When one or more signals contact receiver 236. The signal contacts reflector 337 in contact receiver 236 and at least a portion of the signal bounces back to the transmitter along the same path it took from the transmitter. The signal is amplified by the transmitter, and sent along the same path back to the receiver. At least a portion of the signal is directed to conversion device 339. The process repeats and, after a period of time, the signal strengthens into a focused power signal that is established between the transmitter (not shown) and the receiver 336. The conversion device 339 provides a voltage output to charge control circuitry 345 and voltage regulator 338.

Voltage regulator 338 provides power to processor 332, header 234, object sensor 242 and a status indicator 349.

Once the voltage output of conversion device 339 reaches a threshold voltage, charge control circuitry 345 provides current to energy storage circuitry 346, which charges up and stores the energy. A signal indicative of the voltage output of receiver 336 is received by processor 332. Processor 332 also receives a signal indicative of the charge on energy storage circuitry 346. When storage circuitry 346 has a sufficient amount of charge stored up, the dispenser may operate in its normal fashion. In this exemplary embodiment, charge circuit 345 operates linearly to deliver the maximum charge current into storage device 346 while maintaining the threshold voltage at the output of receiver 336, thus maintaining at least the minimum voltage required for proper operation of regulator 338.

Figure 10:
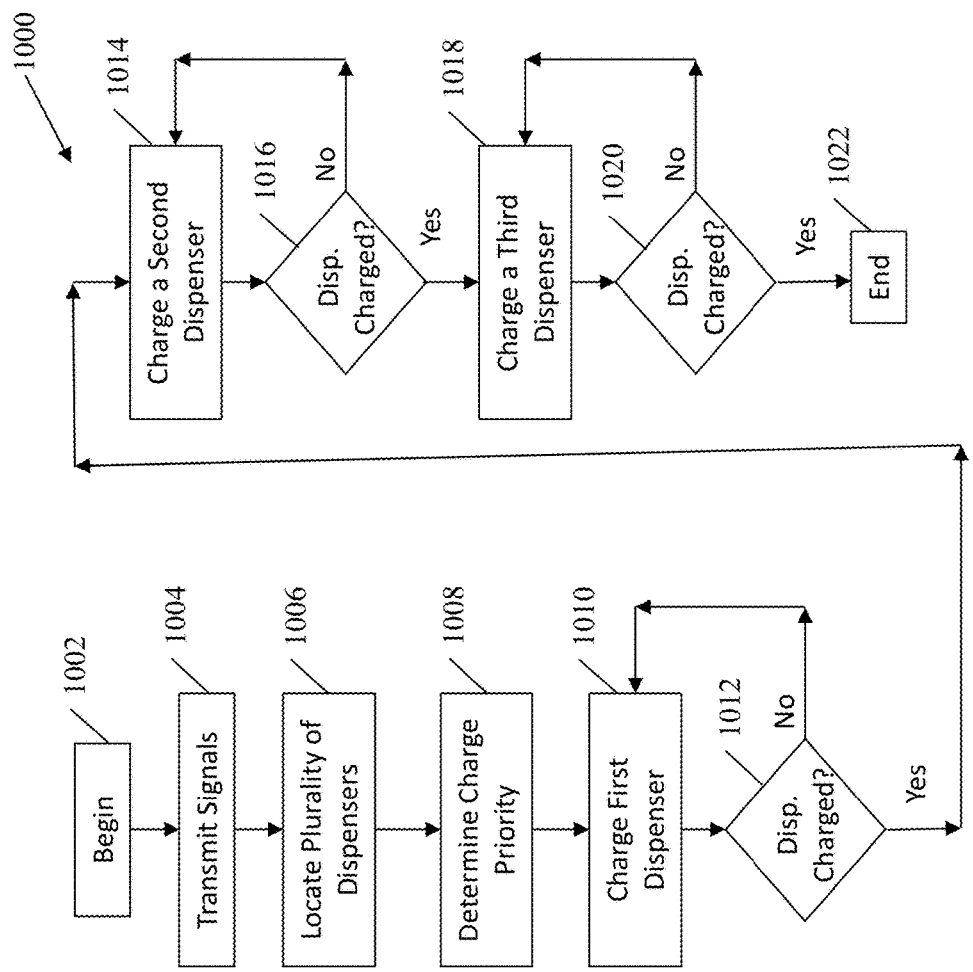
FIG. 10 is an exemplary methodology or logic diagram for determining charge priority for a plurality of dispensers.

The methodologies disclosed herein comprise a number of blocks. In some exemplary embodiments, additional blocks may be used. In some exemplary embodiments, fewer blocks may be used. In some exemplary embodiments, the blocks may be performed in different orders. FIG. 10 is an exemplary methodology for charging a plurality of dispensers 1000. The exemplary methodology for charging a plurality of dispensers 1000 begins at block 1002. At block 1004 a transmitter transmits a plurality of signals into an area where a plurality of dispensers are located. In this exemplary methodology, when the receiver of a dispenser having is contacted by one or more of the plurality of signals, at least a portion of the signal is reflected back to the transmitter, where it is amplified and directed back to the receiver. The process continues for a sufficient time to build up the signal. In this exemplary embodiment, two or more dispensers are in the area and are located at block 1006. At block 1108 a charge priority is established to determine which dispenser is charged first.

The charge priority may be established by any one of the following: the distance between the transmitter and each dispenser; the level of charge on the internal charge storage device of the dispenser; the order the dispensers are located; the location of the dispenser (some dispensers may be in a higher traffic area than others; past history; time until non-functional; and the like. In some embodiments, the charge priority is determined based upon information communicated back to the transmitter from the dispenser. In some embodiments, the charge priority is determined based upon a physical location without the need for communication information. In some embodiments, charge priority is based upon a previous charge history stored in the transmitter.

In some embodiments, the transmitter can determine the distance between the transmitter and each dispenser by, for example, determining the time it takes the signal to be reflected back from the receiver to the transmitter. The longer the time, the further away from the transmitter the receiver on the dispenser is located. Accordingly, the transmitter may determine the distance between the transmitter and the receivers and determine which dispenser to charge and in which order, such as, for example, charging nearest dispenser first followed by the next closest etc.

In some embodiments, the charge priority is a function of the charge state or charge level of the energy storage device in the dispensers. In some embodiments, once the signal is of a sufficient strength, the dispenser communicates its charge status to the transmitter. After each dispenser in the area responds with its charge status, the priority of charging is established. In some embodiments, the dispenser with the lowest charge is charged first, followed by the dispenser with the next lowest charge. In some embodiments, each dispenser is fully charged prior to the next dispenser being charged. In some embodiments, one or more dispensers may be partially charged and then the next dispenser is charged. Such an embodiment may be used, for example, when two or more dispensers have a very low charge and it is important to ensure that the dispensers are charged enough to function as quickly as possible. In some embodiments, if a dispenser charge is below a threshold, it may be immediately charged without further communications with other dispensers.

In some embodiments, the charge priority is pre-determined during installation. For example, if three dispensers are in the receiving area for receiving focused power signals from the transmitter, the transmitter may be programed to charge dispenser 2 first, followed by dispenser 1 and finally to dispenser 3.

In some embodiments, selected dispensers are prioritized over other dispensers. For example, if there are 4 dispensers in the area, dispensers 1 and 3 may be prioritized. Such an embodiment may be useful in an area such as, for example, a bathroom having 4 sinks and 4 dispensers to ensure that at least 1 dispenser located between two of the sinks is charged and able to be used at all times.

In some embodiments, the history of the dispenser usage and/or past charge statuses may be used to determine charge priority. For example, if two dispensers are located in high traffic areas and are used more frequently then other dispensers, those two dispensers may receive a higher charge priority to ensure that those two dispensers always have power.

In some embodiments, the time until "non-functional" may be used to determine charge priority. In this exemplary embodiment, the dispenser communicates a state-of-charge and anticipated usage. For example, the dispenser may determine that will likely be heavily used over the next hours and has a charge that is insufficient to meet the anticipated delivery requests. Accordingly, the priority may be increased to ensure the dispenser is fully charged (or charged to a desired charge) prior to the anticipated heavy use, and/or to ensure that the dispenser is recharged during the time period of anticipated high usage.

After the charge priority is established at block 1008, the dispenser with the first priority is charged at block 1010. At block 1012, a determination is made as to whether the dispenser is charged. In some embodiments, the determination requires the dispenser to be substantially fully charged. In some embodiments, once the dispenser is charged to at least a selected threshold. Once the determination is made that the dispenser is charged, the methodology moves to block 1014 and the second prioritized dispenser is charged. At block 1016 a determination is made as to whether the dispenser has charged to a threshold. If it has, the methodology moves to block 1018 and the next prioritized dispenser is charged. At block 1020 a determination is made as two whether the dispenser is charged to a sufficient status. If it has, the methodology moves to block 1022 and ends. If the dispensers are not fully charged in the exemplary methodology and only charged to a sufficient charge, the methodology may loop back and charge each dispenser to a higher state of charge.

FIG. 11A discloses an exemplary embodiment of a methodology or logic diagram for locating dispensers 1100. The exemplary methodology 1100 begins at block 1102. At block 1104 the transmitter transmits a plurality of signals to a wide area. Similarly to that described above, the transmitters locate a plurality of dispensers at block 1106 within its transmission view. At block 1108, a general location of each dispenser is stored in memory. Knowing the general location of each dispenser allows the transmitter to locate the receivers associated with the dispensers more quickly. This is because, in a normal operation scan, the transmitter scans its entire viewing area in search of receivers, which takes time. If the transmitter knows that there are 5 receivers located within is transmission viewing area and it knows the general location of each dispenser, the transmitter need only look, i.e. direct transmissions, in the general location of each dispenser and need only look for a set amount of dispenser. Accordingly, the transmitter may locate and establish a connection with each dispenser more quickly then if the transmitter is required to search the entire area and/or scan for an unknown number of dispensers.

FIG. 11B is an exemplary embodiment for charging a plurality of dispensers 1120 when the transmitter knows the general location of the dispenser. The exemplary methodology begins at block 1122 and at 1124, one or more signals are transmitted to an general location of a first dispenser. At block 1126, the transmitter establishes a focused power signal with the receiver in the first dispenser and the first dispenser is charged. At block 11128, a determination is made as two whether the first dispenser has been charged to a sufficient threshold. The sufficient threshold may be, for example, fully charged, charged to a set percentage, and/or charged a set percentage above the original state of charge, such as, for example, the threshold may be 40%, and thus, once the charge increases 40%, the dispenser is determined to be charged. Once the dispenser is charged, the transmitter transmits signals to the general location of the second dispenser. At block 1132, a focused power signal is established with the receiver associated with the second dispenser and the second dispenser is charged. At block 1124, a determination is made as to whether the dispenser is charged to a selected threshold. If it has, the methodology moves to block 1136 and ends.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. It is not the intention of the applicant to restrict or in any way limit the scope of the appended claims to such detail. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order in which the steps are presented to be construed as required or necessary unless expressly so stated.

We claim:

1. A dispenser for dispensing soap or sanitizer comprising:
a housing;
a receptacle for retaining a supply of soap or sanitizer;
a processor;
a focused energy signal receiver;
the focused energy signal receiver having
a reflector for reflecting at least a portion of the focused energy signal back to a transmission source; and
a converter for converting at least a portion of the focused energy signal into an output voltage;
charge control circuitry;
one or more capacitors;
wherein the charge control circuitry monitors the output voltage of the converter;
wherein if the output voltage of the converter is above a threshold, the one or more capacitors receive a charging current; and
a motor for causing a product to be dispensed;
wherein the motor receives power from the one or more capacitors to dispense the soap or sanitizer.

2. The dispenser of claim 1 wherein the processor has an input that is indicative of the output voltage of the converter.

3. The dispenser of claim 1 wherein the processor has an input that is indicative of the charge on the one or more capacitors.

4. The dispenser of claim 1 wherein the threshold voltage is set by voltage divider circuitry.

5. The dispenser of claim 1 further comprising back flow prevention circuitry for preventing current to flow from the one or more capacitors to the converter.

6. The dispenser of claim 1 wherein the dispenser is devoid of a battery.

7. The dispenser for dispensing soap or sanitizer of claim 1 further comprising circuitry for transmitting a communications signal to the transmission source.

8. A dispenser for soap or sanitizer comprising:
a housing;
a receptacle for retaining a supply of product;
a processor;
a reflector for reflecting at least a portion of a focused energy signal;
a converter for converting at least a portion of the focused energy signal into an output voltage;
charge control circuitry;
one or more energy storage devices;
wherein the charge control circuitry monitors the output voltage of the converter;
wherein if the output voltage of the converter is above a threshold, the one or more energy storage devices receive a charging current; and
a motor for receiving power from the energy storage device to dispense product.

9. The dispenser of claim 8 wherein the processor has an input that is indicative of the output voltage of the one or more energy storage devices.

10. The dispenser of claim 8 wherein the processor has an input that is indicative of the charge on the one or more energy storage devices.

11. The dispenser of claim 8 wherein the threshold voltage is set by voltage divider circuitry.

12. The dispenser of claim 8 further comprising back flow prevention circuitry for preventing current to flow from the one or more energy storage devices to the converter.

13. The dispenser of claim 8 wherein the one or more energy storage devices comprise one or more capacitors.

14. The dispenser of claim 8 wherein the dispenser is devoid of a battery.

15. The dispenser for soap or sanitizer of claim 8 further comprising circuitry for transmitting a communications signal to the transmission source.

16. An electronic dispenser comprising:
a housing;
a receptacle for retaining a supply of product;
a processor;
a focused energy signal receiver;
a converter for converting the focused energy signal into an output voltage;
charge control circuitry;
one or more energy storage devices;
back flow prevention circuitry that allows current to flow from the converter to the charge control circuitry and prevents current from flowing from the one or more energy storage devices to the converter;
wherein the charge control circuitry monitors the output voltage of the converter;
wherein if the output voltage of the converter is above a threshold, the one or more energy storage devices receive a charging current; and
wherein if the output voltage of the converter is below a threshold, the one or more energy storage devices do not receive a charging current.

17. The dispenser of claim 16 wherein the processor has an input that is indicative of the output voltage of the one or more energy storage devices.

18. The dispenser of claim 16 wherein the processor has an input that is indicative of the charge on the one or more energy storage devices.

19. The dispenser of claim 16 wherein the threshold voltage is set by voltage divider circuitry.

20. The dispenser of claim 16 wherein the one or more energy storage devices comprise one or more capacitors.

\* \* \* \* \*

UNITED STATES PATENT AND TRADEMARK OFFICE
CERTIFICATE OF CORRECTION

| | | |
|---|---|---|
| PATENT NO. | : 11,266,276 B1 | Page 1 of 1 |
| APPLICATION NO. | : 17/140575 | |
| DATED | : March 8, 2022 | |
| INVENTOR(S) | : Wegelin et al. | |

It is certified that error appears in the above-identified patent and that said Letters Patent is hereby corrected as shown below:

On the Title Page

Item (72) Inventor is corrected to read:
-- Jackson W. Wegelin, Stow, OH (US);
Chip W. Curtis, La Moille, IL (US);
Mark T. Smith, Canton, OH (US);
Alexander Slepoy, Chandler, AZ (US) --.

Signed and Sealed this
Twenty-sixth Day of March, 2024

*Katherine Kelly Vidal*

Katherine Kelly Vidal
*Director of the United States Patent and Trademark Office*